Figure 7:
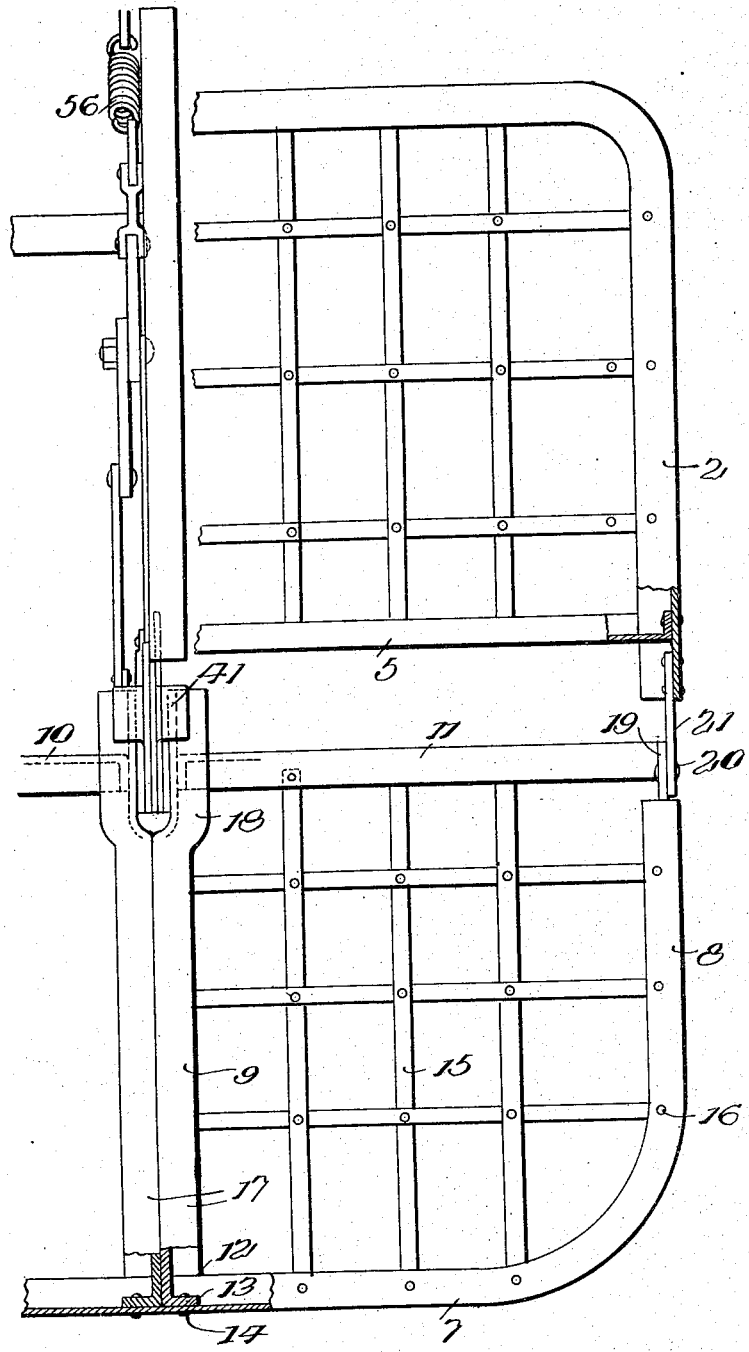

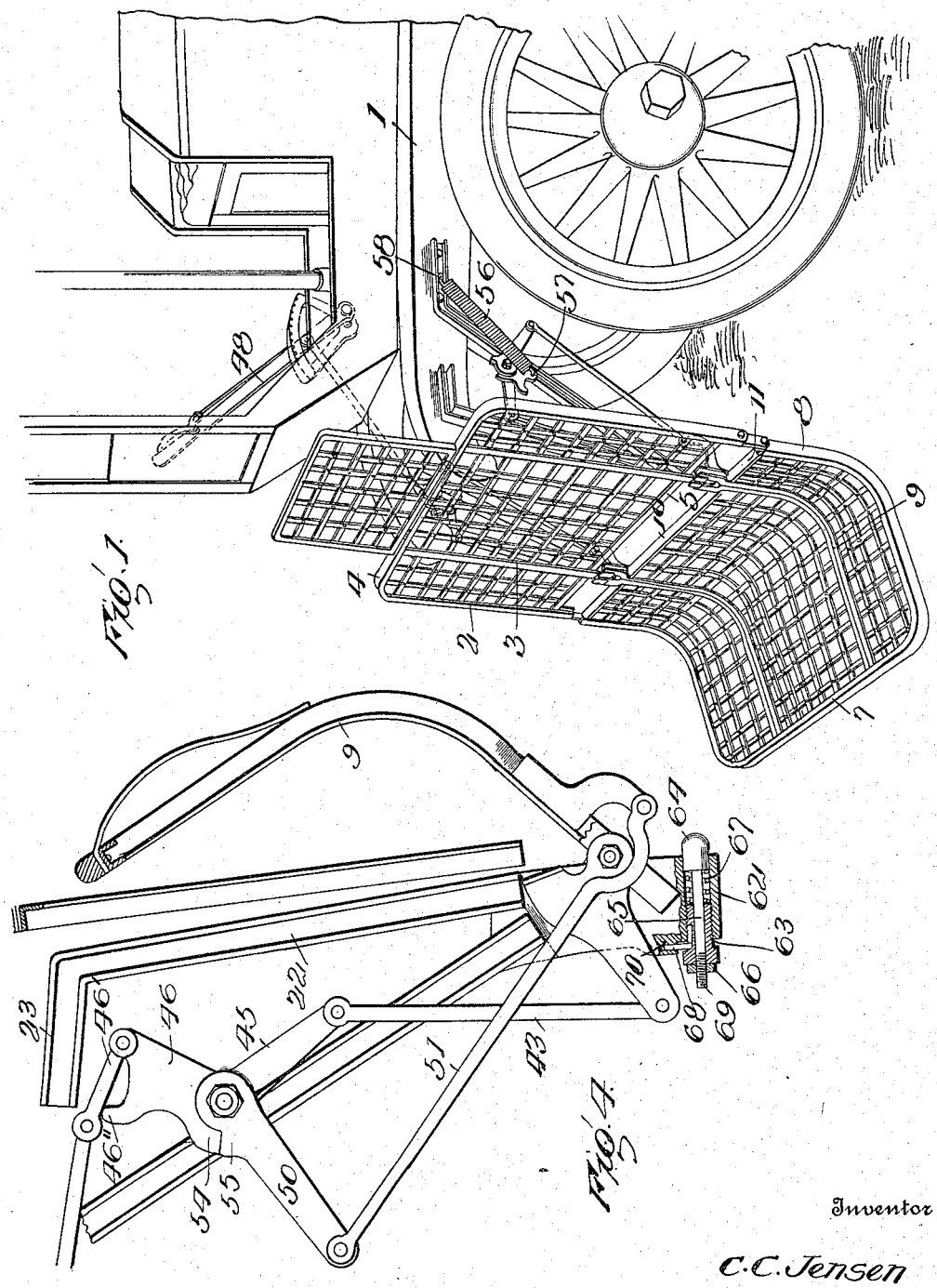

C. C. JENSEN.
FENDER.
APPLICATION FILED MAY 27, 1915.
1,174,322.
Patented Mar. 7, 1916.
4 SHEETS—SHEET 2.
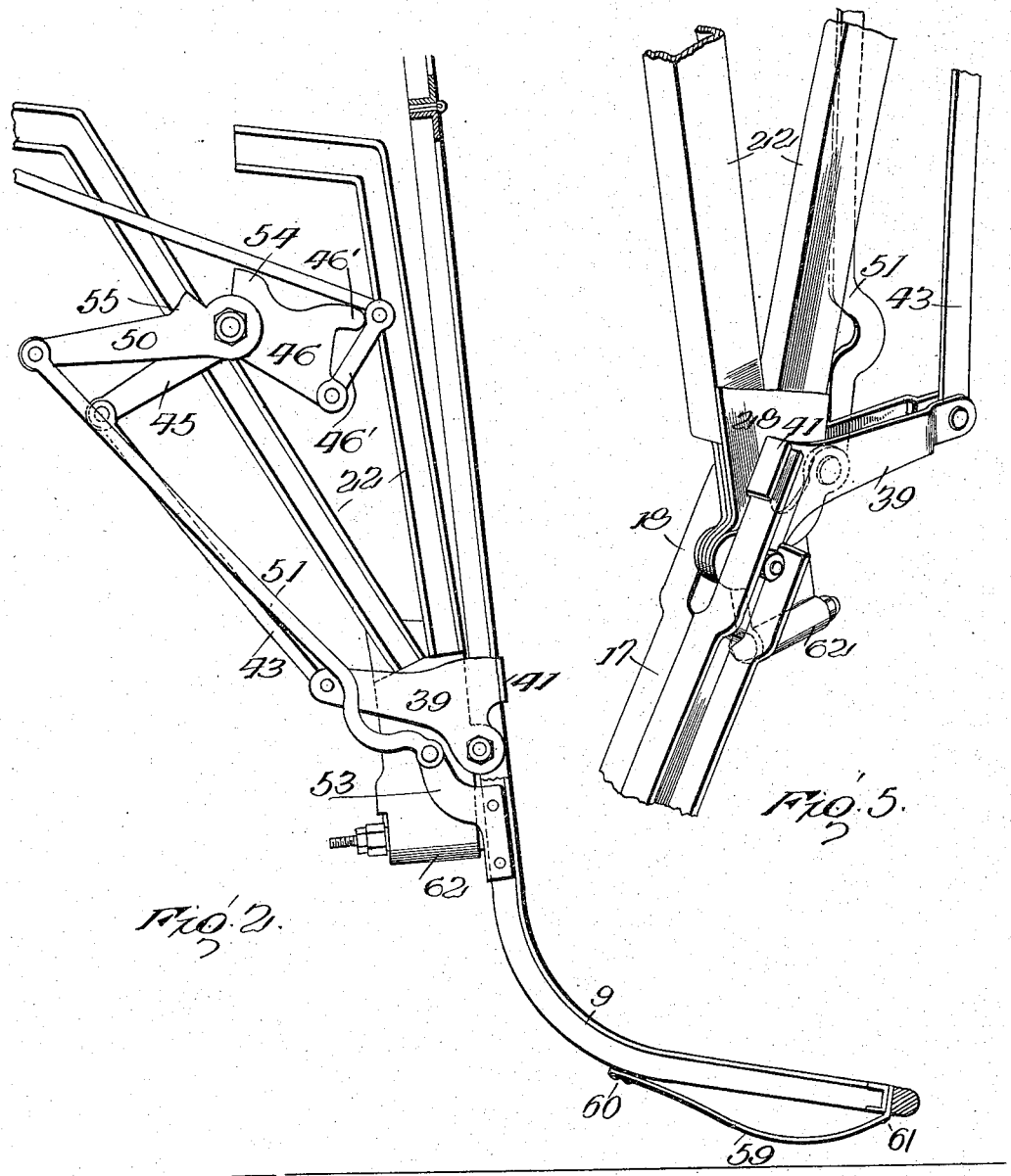
Inventor
C.C. Jensen
By
_____, Attorneys.

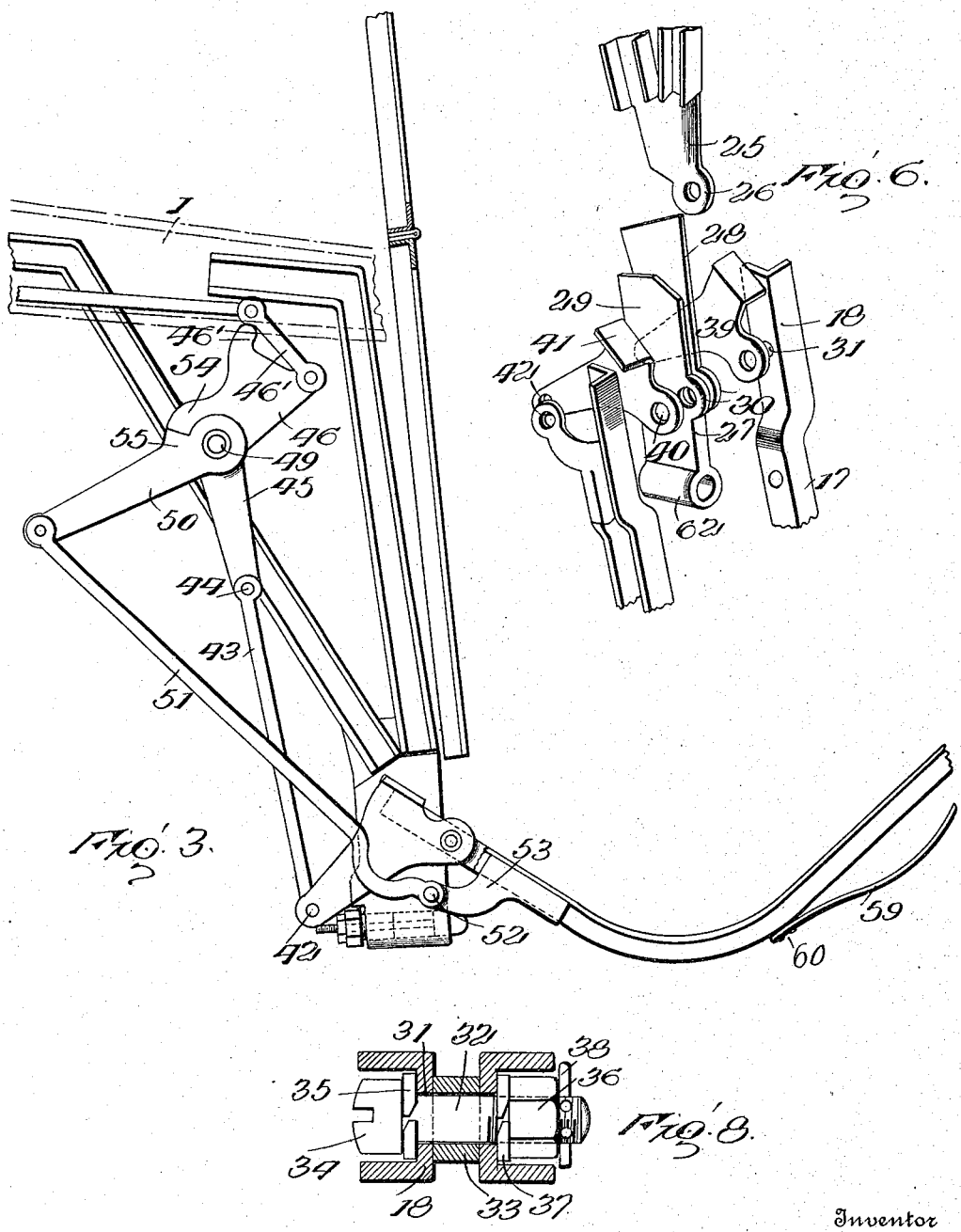

C. C. JENSEN.
FENDER.
APPLICATION FILED MAY 27, 1915.

1,174,322.

Patented Mar. 7, 1916.
4 SHEETS—SHEET 4.

Inventor
C. C. Jensen

By
Attorneys

UNITED STATES PATENT OFFICE.

CARL C. JENSEN, OF CHICAGO, ILLINOIS.

FENDER.

1,174,322.

Specification of Letters Patent.

Patented Mar. 7, 1916.

Application filed May 27, 1915. Serial No. 30,835.

*To all whom it may concern:*

Be it known that I, CARL C. JENSEN, a citizen of the United States, residing at Chicago, in the county of Cook and State of Illinois, have invented certain new and useful Improvements in Fenders, of which the following is a specification.

This invention relates to automobile fenders of that type including a relatively fixed section and a foldable or otherwise movable section.

It is one aim of the invention to provide a novel lever mechanism for adjusting the movable fender section, the arrangement of the levers being such that the operating lever may conveniently and with little exertion be swung to raise or lower the movable fender section.

The invention also has for its object to provide a novel construction of fender frame and a novel arrangement of the members of the frame and of the elements comprising the lever mechanism for adjusting the movable fender section.

Another aim of the invention is to provide means adapting the movable fender section to ride over inequalities in the road surface without liability of being damaged.

In the accompanying drawings: Figure 1 is a perspective view of the fender embodying the present invention mounted upon a motor vehicle. Fig. 2 is a side elevation of the fender, the lower section thereof being shown in operative position. Fig. 3 is a similar view illustrating the said section partly raised. Fig. 4 is a similar view illustrating the section completely raised. Fig. 5 is a perspective view of a portion of the lever mechanism for raising and lowering the said section of the fender. Fig. 6 is a group perspective view of the structure shown in Fig. 5. Fig. 7 is a plan view in detail of one side of the fender. Fig. 8 is a detail transverse longitudinal sectional view through one of the pivots for supporting the said lower section of the fender.

Corresponding and like parts are referred to in the following description and indicated in all the views of the accompanying drawings by the same reference characters.

In the drawings, the fender is illustrated as mounted upon a chassis frame, the bars comprising this frame being indicated in general by the numeral 1. It will be understood, however, that the fender may be mounted upon some other portion of the machine. For example, where the fender is to be mounted upon a passenger automobile, the chassis bars will be found the most convenient supports, and when the fender is to be mounted upon an automobile truck, the sides of the truck or the sides of the floor thereof will in all probability be found the most convenient support. The fixed fender section includes side bars 2 and intermediate bars 3, the side bars 2 at their upper ends being turned laterally inwardly to form a top frame member 4 and the lower ends of the intermediate bars 3 and their respective side bars being connected by a lower cross frame member 5. The lower or movable fender section includes a bottom cross bar 7 which, at its ends, is turned rearwardly and thence upwardly, as at 8, to form the side members of the frame of this section, and the said frame further includes intermediate members, indicated in general by the numeral 9, and each consisting of a pair of united angle bars, as will be presently more specifically pointed out. The frame members 9 are connected with each other adjacent their upper ends by a top cross bar 10 and at their said ends are connected to the upper ends of the side members 8 by means of other cross bars 11. The bars comprising the frames of the fender sections are preferably all of angle or channel iron formation, as will be apparent by reference to the drawings.

By reference now to Fig. 7, it will be apparent that where the end of one bar of the frame of either section joins another bar, the flanges at the end of the first-mentioned bar are cut-away, as for example, as indicated at 12 in the said Fig. 7, so that their ends will abut against the edges of the flanges or wings of the second-mentioned frame bar, and the connecting portion of the first-mentioned bar is fitted between the flanges of the second-mentioned bar and bent, as at 13, and secured by a rivet 14 to the connecting portion of the said second-mentioned bar. In this manner, the bars comprising the frames are securely and firmly united to each other in their proper assembled relation, and the frames are not liable to become distorted in use. The fender sections are completed by fillers 15, preferably in the nature of suitable lengths of strap iron, arranged in crossed relation in the open portions of the frames of the fender sections and riveted to each other at their point of intersection and at their ends riveted to the flanges of the frame members, as indicated at 16. As before stated, the frame members 9 are made up of united channel bars, these bars being indicated in the drawings by the numeral 17 and at their upper ends being relatively offset laterally, as at 18, these offset portions constituting one means for the hinged connection of the lower section of the frame with the upper section thereof, as will be presently more specifically explained. Secured within the channel of each side member 8 of the frame of the lower fender section, is a plate 19 pivotally connected, as at 20, with a similar plate 21 secured within the channel of the corresponding frame member 2. Secured in any suitable manner to the rear side of the fixed section of the fender are pairs of brace bars 22 and the said brace bars 22 have their upper ends turned to extend rearwardly, as indicated at 23, these rearwardly turned portions constituting the attaching portions for the fender and being secured, as will be readily understood, to the chassis bars or the sides of the automobile, as the case may be. When in place, the entire fixed section of the fender is inclined rearwardly to a slight degree, and the brace members 22 extend upwardly and rearwardly from the lower ends of the frame bars 3 in the manner shown in the drawings. The lower ends of each pair of the brace members are integrally connected by a web 25 having an apertured ear 26.

The numeral 27 indicates a casting or head which is formed at its upper end with wings 28 and 29 which are spaced and between which is fitted the web 25, and the lower ends of the brace members 22 abut against the upper end of the wing 29 as shown in the drawings. The wings 28 and 29 are formed at their forward edges with apertured pivot ears 30 registering with the ear 26. The offset upper ends of the bars 17 are formed with pivot openings 31 which register with the openings in the ears 30. In order to pivotally unite these parts and thereby complete the hinge connection between the movable fender section and the fixed section thereof, there is provided a bolt 32 which is fitted through the openings 31, and which has fitted upon it a bushing 33, the bushing fitting within the openings in the ears 26 and 30 and abutting at its ends against the opposing faces of the offset portions of the said bars 17 and being of a length sufficient to so space the offset ends of the said bars as to permit of free pivotal movement of the parts. The bolt 32 is provided at one end with a head 34 which bears against a split washer 35 arranged upon the bolt between it and the connecting portion of one of the bars 17, and a nut 36 is threaded onto the other end of the bolt and bears against a washer 37, corresponding to the washer 35. A cotter pin 38 is preferably fitted through the bolt and serves to prevent backward rotation of the nut.

The lever mechanism provided for moving the lower fender section, includes arms 39 of which a pair is provided in connection with each frame member 9, the arms being formed at their forward ends with openings 40 pivotally fitting the bushing 33 of the respective frame member 9 and the said arms being located one between each face or side of the head 27 and the offset upper end 18 of the respective bar 17. Each arm is provided at its upper edge with a laterally projecting lip 40 which extends into engagement with the upper side of the offset end of the respective bar 17, and at their rear ends the arms are pivotally connected, as at 42, to the lower end of a connecting rod 43. The upper end of this rod is pivoted, as at 44, to one arm 45 of a rock lever, the other arm of this lever being indicated by the numeral 46. A rod 47 is pivotally connected to one end of a link 46' and the other end of this link is pivotally connected to the lever arm 46 of one of the rock levers and at its other end to an operating lever 48 upon the automobile. The rock lever comprising the arms 45 and 46 is pivotally mounted at the juncture of its said arms, as at 49, upon the respective frame member 3 and the pivot 49 also supports a lever arm 50 to which is connected the upper and rear end of a rod 51. The forward end of the rod 51 is pivoted, as at 52, to an arm 53 which is secured at one end within the channel of the offset portion 18 of one of the bars 17. The rock lever comprising the arms 45 and 46 is movable upon the pivot 49 independently of the arm 50 under certain conditions which will be presently explained, and in order that the arm 50 may be moved in unison therewith, when necessary, the arm 46 and arm 50 are provided respectively with lugs 54 and 55 which are to coöperate with each other for the purpose stated.

Referring now to Fig. 2 of the drawings, it will be observed that, when the movable fender section is in lowered position, the ends of the bars 17 will engage beneath the lips 41 and the said fender section will be supported rigidly against further downwardly swinging movement. Should it be desired to raise the lower fender section, the lever 48 is swung rearwardly so as to pull upon the rod 47 and rock the lever comprising the arms 45 and 46. During the initial rocking movement of this rock lever, the arms 39 will be swung downwardly and the lips 41 will be caused to bear downwardly against the offset upper ends of the said bars 17 above the pivot for the base. As a result, the lower fender section will be swung upwardly until it has assumed about the position shown in Fig. 3. In the meantime the lug 54 will have been brought into engagement with the lug 55, and, upon further movement of the operating lever 48, the arm 50 will be swung downwardly, thereby shoving in a forward and downward direction upon the arm 53 until the fender section has been swung up to about the position shown in Fig. 4.

From the foregoing description, it will be apparent that by reason of the compound lever arrangement provided, the lower section of the fender may be swung to complete raised position, which would be impractical if not impossible by the employment of a simple lever device, or in other words, one consisting merely of a lever arm connected with the movable fender section and having direct connection with the operating lever.

To assist in raising the lower fender section, a spring 56 is connected at one end, as at 57, to that one of the arms 46 other than the one to which the rod 47 is connected, and the spring is connected at its other end, as at 58, to the frame or body of the vehicle or to one of the brace members 22.

By reference to Fig. 2, it will be noted that the lower fender section may have free upward swinging movement, inasmuch as the arm 50 is free to rock upon the pivot 49 independently of the rock arm 46, and this free swinging movement of the lower fender section is provided for in order that the same may pass over inequalities in the road surface, and to guide the said section over such inequalities, a relatively wide and heavy leaf-spring 59 is secured at one end, as at 60, to the frame of the fender section and at its lower end, as at 61, to the front of said frame, one of these springs being located at each side of the section and the springs being bowed between their attached ends in the manner clearly shown in Figs. 2, 3 and 4. It will be obvious that the bowed portions of these springs ride over the ground surface when a rise in the surface is encountered and that, due to their resiliency, the shock of any sudden impact is absorbed and injury to the fender section is provided against.

In order that the lower hinged section of the fender may be cushioned in its lowering movement and may be yieldably supported in its lowered or active position, the head or casting 27 is formed at its lower end with an open ended barrel 62, in one end of which is adjustably threaded a sleeve 63. The numeral 64 indicates a plunger head which is slidably fitted in the other end of the barrel and is provided with a stem 65 slidably fitting within the bore of the sleeve 63. The end of the stem 65 is threaded and a nut 66 is adjustably threaded thereon and is adapted to strike against the outer end of the sleeve 63 and serve as a means for limiting the forward movement of the plunger, a spring 67 being arranged within the barrel and bearing at one end against the plunger head 64 and at its other end against the inner end of the sleeve 63. As stated, the sleeve 63 is adjustable and consequently the tension of the spring 67 may be varied and further, by adjusting the nut 66, the distance to which the plunger head may project beyond the forward end of the barrel may be regulated. In order to prevent accidental rotation of the sleeve 63, a pin 68 is arranged within a socket at the rear side of the head 27 and seats at its lower end in a groove 69 formed in one side of the said sleeve 63 and extending longitudinally thereof, the pin being forced downwardly by means of a spring 70, also arranged within the said socket.

It will be observed that the lever arm 46 is provided with an upstanding lug 46'' which is so located as to be engaged by that end of the link 46' which is connected to the rod 47, when the movable fender section is in lowered position, and by reason of this engagement of the link with the said lug, the point of pivotal connection of the link 46' with the lever arm 46 may pass below the pivot upon which the said arm 46 is mounted and yet a pull upon the operating lever will serve to swing the said arm in a rearward direction.

Having thus described the invention, what is claimed as new is:

1. In a fender, a fixed fender section, a movable fender section, an operating lever, and a system of lever devices arranged to be successively brought into operation upon movement of the operating lever to move the movable fender section through successive stages of its movement from one position to another.

2. In a fender, a fixed fender section, a movable fender section, an operating lever, a member mounted for rocking movement and having operative connection with the said operating lever, an arm mounted for rocking movement and connected with the said movable fender section, coöperative means upon the said fender and arm for connecting the arm for movement with the said member when the member has been rocked to a predetermined position, and means arranged for actuation by the said member for moving the said movable fender section prior to coöperation of the member with the said fender to move the said section.

3. A fender comprising a section mounted for movement to operative and inoperative positions, an operating lever, and a system of lever devices arranged to be successively brought into operation upon movement of the operating lever to move the said section through successive stages of its movement from one position to another.

4. In a fender, a movable fender section, an operating member, an arm mounted for rocking movement and having connection with the said fender section, an arm mounted for rocking movement independently of the first-mentioned arm and arranged when initially rocked in one direction to move the fender section in one direction, and coöperating means upon the said arms whereby further movement of the first-mentioned arm in such direction will cause corresponding movement of the second-mentioned arm whereby to further move the fender section in such direction.

5. In a fender, a fixed fender section, a movable fender section, an operating lever, means arranged upon initial movement of the operating lever in one direction to move the movable section through one stage of its movement from one position to another, and means arranged upon further movement of the operating lever to further move the fender section in such direction.

6. In a fender, a fixed fender section, a movable fender section, an operating lever, rock arms mounted for independent movement, connection between one of the arms and the operating lever, a member mounted for rocking movement and arranged to coöperate with the movable fender section to move the same through one stage of its movement from one position to another, connection between the said member and the first-mentioned arm, connection between the other arm and the said fender section, and coöperating means upon the arms arranged to connect the second-mentioned arm for movement with the first-mentioned arm when the first mentioned arm has been moved to a predetermined position.

7. In a fender, a fixed fender section, a movable fender section, an operating lever for raising and lowering the movable fender section, and connection between the said lever and the said section permitting movement of the said section independently of the lever.

8. In a fender, a movable fender section, a system of lever devices arranged at each side of the fender section, the devices of each system being arranged to be successively brought into operation to move the movable fender section through successive stages of its movement from one position to another, an operating lever connected with one of the systems of lever devices, and a spring connected with the other system of lever devices and arranged to assist in moving the fender to raised position.

9. In a fender, a fixed fender section including frame bars and associated brace bars connected at their lower ends, plates secured to the connected lower ends of the said bars and having pivot openings, a movable fender section having frame bars arranged at their upper ends with the spaced portions to receive between them the said plates upon the lower ends of the respective bars of the fixed fender section, bolts fitted through the said portions of the frame bars of the movable fender sections, bushings upon the bolts fitted within the pivot openings in the plates, an operating lever, and connection between the said lever and the movable fender section for moving the latter.

10. In a fender, a fixed fender section including frame bars and associated brace bars connected at their lower ends, plates secured to the connected lower ends of the said bars and having pivot openings, a movable fender section having frame bars provided at their upper ends with spaced portions to receive between them the said plates upon the lower ends of the respective bars of the fixed fender section, bolts fitted through the said portions of the frame bars of the movable fender section, bushings upon the bolts fitted within the pivot openings in the plates, an arm mounted upon one of the pivots for rocking movement, an abutment upon the arm engaging with the respective frame bar of the movable fender section whereby, when the arm is rocked in one direction, the said fender section will be moved upwardly upon its pivots, a rock arm having connection with the first-mentioned arm, an operating lever, connection between the operating lever and the second-mentioned arm, an arm mounted for rocking movement beside the second-mentioned arm, connection between the last-mentioned arm and the movable fender section, and coöperating means upon the second and last-mentioned arms arranged to connect the last-mentioned arm for rocking movement with the second-mentioned arm, when the latter has been moved to a predetermined position.

11. In a fender, a fender section mounted for vertical swinging movement, a support for the said section, a spring pressed plunger mounted upon the support and adapted to serve as a buffer for the said section when the section is in active position, and means for adjusting the plunger with relation to the said section.

12. In a fender, a fender section mounted for vertical swinging movement, a support for the said section, a barrel upon the support, a sleeve adjustably threaded in one end of the barrel, a plunger head fitted in the other end of the barrel and provided with a stem slidably fitting within the bore of the sleeve, a spring arranged within the barrel and bearing against the inner end of the sleeve and against the said plunger head, and a nut threaded upon the stem of the plunger and constituting an abutment for coöperation with the outer end of the said sleeve, the plunger head constituting a buffer for the fender section when the section is moved to active position.

In testimony whereof I affix my signature in presence of two witnesses.

CARL C. JENSEN. [L. S.]

Witnesses:
W. F. PEREZ,
JAMES DICKSON.